United States Patent [19]

Hauraux et al.

[11] 4,027,909
[45] June 7, 1977

[54] RESILIENT MOUNTING FOR VEHICLE BUMPER BAR

[75] Inventors: Pierre Hauraux, Paris; Michel Domer, Montigny-les-Cormeilles, both of France

[73] Assignee: Paulstra, France

[22] Filed: July 21, 1975

[21] Appl. No.: 597,947

[30] Foreign Application Priority Data

Aug. 2, 1974 France .............................. 74.26970

[52] U.S. Cl. ................................................ 293/88
[51] Int. Cl.² .......................................... B60R 19/06
[58] Field of Search ............... 293/71 R, 71 P, 65, 293/64, 70, 73, 87, 88, 85, 62, 63; 188/1 C; 267/139

[56] References Cited

UNITED STATES PATENTS

| 3,056,620 | 10/1962 | Adams et al. ................... 293/71 R |
| 3,694,018 | 9/1972 | Levering ............................ 293/88 |
| 3,739,882 | 6/1973 | Schwenk et al. .................. 293/88 |
| 3,795,418 | 3/1974 | Barenyi et al. .................... 293/88 |
| 3,854,765 | 12/1974 | Church et al. ................. 293/86 X |
| 3,857,596 | 12/1974 | Nakamura et al. ................ 293/88 |
| 3,876,244 | 4/1975 | Haberele et al. .................. 293/88 |

*Primary Examiner*—Stanley H. Tollberg
*Assistant Examiner*—Norman L. Stack
*Attorney, Agent, or Firm*—Larson, Taylor and Hinds

[57] ABSTRACT

The bumper bar of a vehicle is mounted by means of shock-absorbing resilient cushions which are arranged to be stressed in shear when forces are exerted longitudinally of the vehicle. Preferably the cushions are stressed partially in shear and partially in compression both for longitudinal forces and for lateral forces.

7 Claims, 7 Drawing Figures

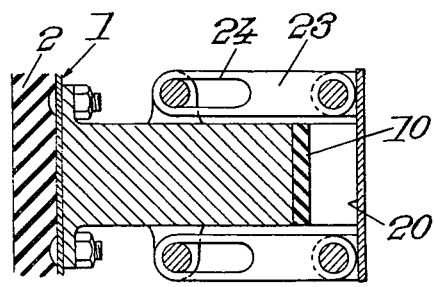
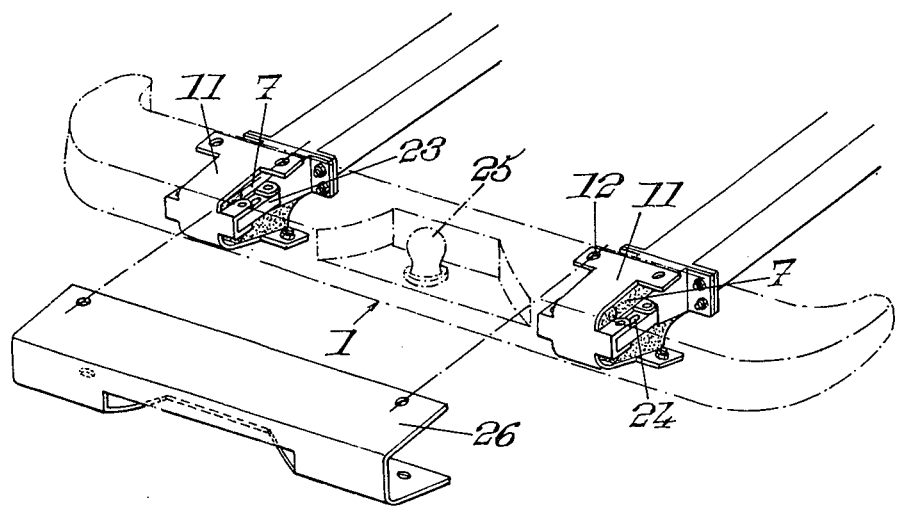

RESILIENT MOUNTING FOR VEHICLE BUMPER BAR

The invention relates to resilient mountings for bumpers of vehicles, especially for motor vehicles, in relation to which, by way of example, the invention will be described in the following specification.

It is already known to provide a resilient mounting for bumpers by means of shock-absorbing, resilient cushions of rubber or other elastomer. However in the known devices the rubber cushions were made to work primarily or exclusively under compression, which allowed only a small absorption of energy.

According to the invention, it has been contrived to increase the shock absorption energy considerably by including in the said bumpers absorbing devices cushioned by rubber or other elastomers, wherein the rubber can operate under shear, which allows a larger relative motion of the opposing rigid elements, thus increasing the work done to secure shock absorption.

In particular, it is advantageous to have recourse to absorbing devices in which the rigid elements connected by the rubber cushions are shaped obliquely with respect to the direction of relative motion, the rubber then operating simultaneously under shear and under compression.

This double effect of shear and compression can be provided not only for frontal shocks, that is to say those directed essentially along the line of motion of the vehicle, but also for sideways shocks or those including a sideways component. Moreover the compression effect is capable of assisting or reinforcing the work of adhesion of the rubber when shocks occur.

The rubber may be subjected during installation to a precompression which may possibly be adjustable.

The invention will be well understood from the description which follows, as well as from the attached drawings; the description and the drawings are of course only given by way of illustration.

FIG. 1 of these drawings shows in schematic perspective a bumper assembly set up according to the invention.

FIGS. 2 and 3 respectively show, in vertical section and in a section through III—III of FIG. 2 but following a variant, the essential shock-absorbing elements of these bumpers.

FIG. 6 illustrates similarly to FIG. 5 another embodiment.

Figure 1:
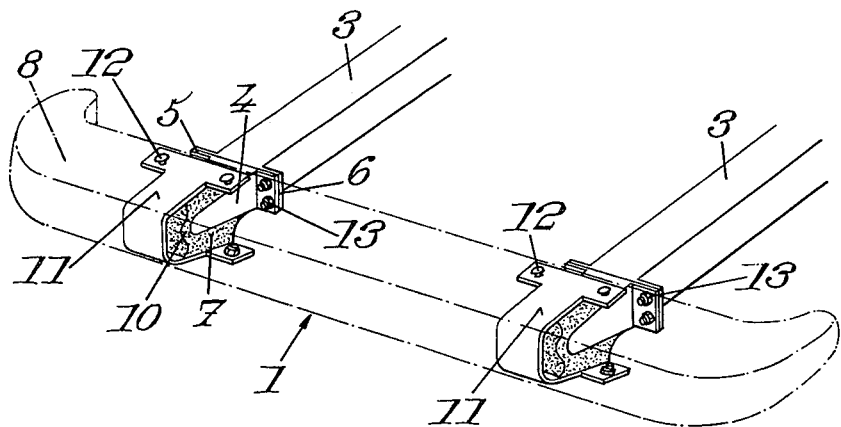
Figure 2:
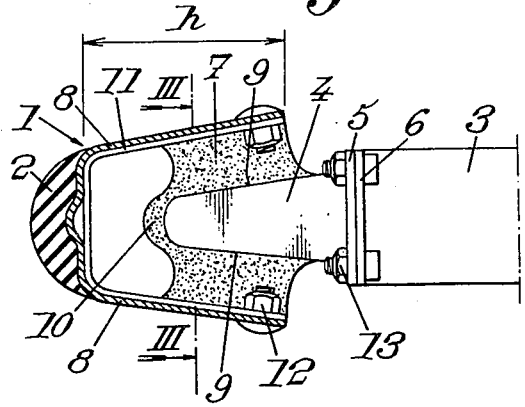

Finally FIG. 7, like FIG. 1, is a perspective view, according to another variant, of a rear bumper with a device for attaching a caravan or trailer, the whole being in conformity with the invention.

The bumpers themselves, apart from the shock-absorbing means which will be discussed, are fitted up in any appropriate manner, being given a suitable rigidity. Thus they can be constituted by hollow metallic elements 1 (FIGS. 1 to 7), produced by stamping or in any other way, their outer surfaces being advantageously covered with a rubber 2.

The linkages with the chassis of the vehicle — for example with the ends of the side-members such as 3 — are secured in such a way that elastic media are interposed in these linkages which are able, when acted on by the shocks to be absorbed, to work at least under shear or preferably under simultaneous shear and compression.

Thus on the assumption that the element 1 constituting a bumper is given a hollow shape in the form of a flared U, of sufficient depth $h$ to obtain the desired shock-absorbing effect, rubber cushions such as 7 are interposed between this sectional iron and a central support element 4 which is joined at its base 5 to the end 6 of corresponding side-member 3, the assembly being realized in such a way that, owing to the obliquity of the faces 8 of the bumper 1 relative to the median plane of the vehicle, the cushions 7 can operate under shear and compression when a shock is being absorbed.

The central element 4 (FIGS. 1 to 3) is advantageously given a sectional form such that its flanks 9, engaging with the cushions 7, appear almost parallel to the flanks of the bumper 1 or follow a slightly different direction.

Moreover it is advantageous to proceed so that the rubber projects at 10 beyond the end of the central element 4, so as to form an end stop.

Figure 3:
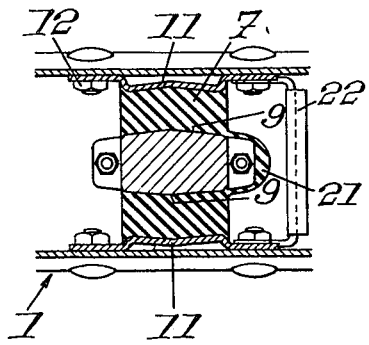
Figure 4:
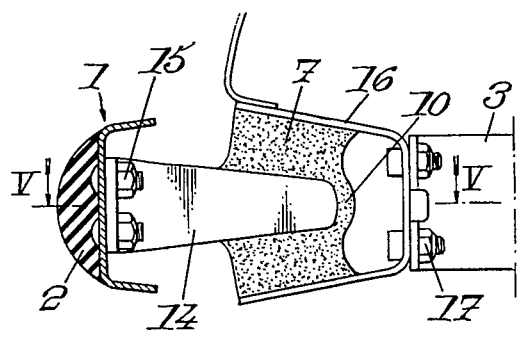
FIG. 4 illustrates, similarly to FIG. 2, a further embodiment of the invention.

In order to ensure easy installation of se devices, it is arranged that the rubber, which is for example stuck directly on to the faces 9 of the central element 4, should outwardly be attached not directly to the faces 8 of the bumper but to casings 11 of the appropriate shape which are later fixed, for example by bolts 12, on to the said faces 8. In addition, the base 5 will itself be fixed to the end 6 of the side-member by other bolts 13 or the like. As illustrated in FIG. 3, casings 11, in cross section, each form a small acute angle with a line parallel to the longitudinal axis of the casing.

In such as assembly, frontal shocks are thus absorbed by the operation under shear (and also under compression) of cushions 7, owing to the obliquity of the faces 8 and 9.

It is to be further noted that with lateral shocks the cushions 7 operate under shear as before, but it is an advantage to proceed so that they too operate simultaneously under shear and under compression, for which reason the element 4 is given a trapezoidal or even a lozenge-shaped section instead of a rectangular one, as illustrated in the variant of FIG. 3, while the corresponding faces of the casings 11 too are given an inclination which accords with that of the respective flanks of the cross-section of the said element 4.

This arrangement ensures restoring forces such that the bumper always stays in a stable mean position after the shock.

It may also be of advantage to provide stops for transverse motions, such as those shown by 21, 22 in FIG. 3, to protect the body-work.

Starting from the embodiment which has just been described, it is possible to devise numerous more or less analogous variants.

Thus (FIG. 4) the cushions 7 could rest on the one hand on a central element 14, integral with the bumper (which in this case does not need to be so deep), and on the other hand against a casing 16 integral at 17 with the side-member 3, the same effect being obtained.

Finally it will generally be proper to pre-stress the rubber, which can be achieved in many suitable ways.

Figure 5:
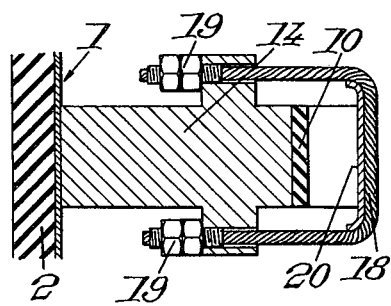
FIG. 5 is a horizontal section illustrating other features of the invention.

Thus in FIG. 5 there is illustrated (very schematically and particularly for the case of FIG. 4) a mode of embodiment in which means such as a cable 18 adjustable by means of bolts 19 connect the central element 14 with the bottom 20 of the external casing 16.

But also means could, as shown in FIG. 6, be constituted to produce and maintain the pre-stress by interposing connecting pieces 23 between the elements between which this pre-stress is effected, the connecting pieces being provided with slots 24 to allow relative motion during shocks.

The invention can be applied to front bumpers as well as to rear bumpers. FIG. 7 shows the application to a rear bumper, combined with a ball-joint 25 (knob) for attachment of a caravan. At 26 a reinforcement or shield for the joint is seen; this reinforcement is mounted removably on the bumper.

As a result, whatever the mode of embodiment chosen, an assembly can be set up which functions as follows.

Frontal shocks are absorbed by the relative displacements of the casings 11 with respect to the components 4 (FIGS. 1 to 3), in the axial direction parallel to the direction of travel of the car, while lateral shocks or those with a lateral component are absorbed by the operation of the rubber 7 in the transverse direction both in shear and in compression.

It is also to be noted that owing to the simultaneous operation of the rubber under compression and under shear there is no danger that the bumper 1 should tend to tilt as an effect of its weight. Neither is there a danger that it will begin to "thrash", that is to say to oscillate as a result of the roughness of the road or the oscillations of the vehicle; this is because the compression of the rubber opposes such a motion.

Finally, if a sufficient travel h is selected, very considerable shocks can be contained, and this without taking up noticeably more space than is usual.

An assembly of this kind thus appears to answer to practical requirements.

As is obvious and as results from what has been said, the invention is in no way limited to those of its modes of embodiment which have been more particularly considered; on the contrary it embraces all the variants thereof.

We claim:

1. In a vehicle comprising an energy-absorbing means employing a resilient elastomeric cushion means disposed between the vehicle bumper and the vehicle frame, the improvement wherein said energy-absorbing means comprises a rigid casing member, of generally U-shaped configuration as viewed in transverse cross-section perpendicular to the bumper, affixed to, but formed separate from, one of said bumper and said frame and defining a cavity, the side walls of said casing member forming said U-shaped configuration being inclined outwardly; the side walls of said casing member, in cross-section, forming a small acute angle with a line parallel to the longitudinal axis of said casing member, and a support member which partially projects into the cavity defined by said casing member, said support member being affixed at one end thereof to the other one of said bumper and said frame, and the surfaces of said support member which oppose said side walls of said casing member being inclined in a direction toward said cavity and substantially conforming in shape to the shape of said side walls, a said elastomeric cushion means being disposed between said support member and said casing member and being bonded to said inclined surfaces of said support member and to the opposed internal surfaces of said side walls of said casing member so that by virtue of the opposed inclined surfaces of said members the energy-absorption means absorbs stresses in both shear and compression.

2. An energy-absorbing means as claimed in claim 1 further comprising resilient stop means located at the end of said support member opposite to said one end.

3. An energy-absorbing means as claimed in claim 2 wherein said cushion means comprises a single elastomeric member which is bonded to said surfaces of said support member and said opposite end thereof, and to said opposed surfaces of said casing member.

4. An energy-absorbing means as claimed in claim 1 wherein one of said members includes a surface which, as viewed in vertical cross-section parallel to the bumper when said energy-absorbing means is in place, is inclined relative to the horizontal.

5. An energy-absorbing means as claimed in claim 4 wherein said inclined surface of said support member is of the form of a shallow inverted V comprising first and second inclined surfaces.

6. An energy-absorbing means as claimed in claim 2 further comprising mechanical connecting means for connecting said casing member to said support members so as to initially prestress said cushion means and to permit relative movement between said casing member and said support member.

7. An energy-absorbing means as claimed in claim 6 wherein said mechanical connecting means includes a link and slot connection.

* * * * *